(12) United States Patent
Kitson et al.

(10) Patent No.: US 6,977,671 B1
(45) Date of Patent: Dec. 20, 2005

(54) UNDERWATER WIRELESS IMAGING METHOD AND SYSTEM

(75) Inventors: Frederick Lee Kitson, Livermore, CA (US); Marc P. Schuyler, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 739 days.

(21) Appl. No.: 10/052,786

(22) Filed: Nov. 10, 2001

(51) Int. Cl.[7] .............................................. H04N 7/18
(52) U.S. Cl. ......................................... 348/81; 348/61
(58) Field of Search .......................... 348/61, 81, 123, 348/115; 345/8; 349/11; 367/131

(56) References Cited

U.S. PATENT DOCUMENTS

| | | | | |
|---|---|---|---|---|
| 3,892,234 A | * | 7/1975 | Jones | 128/201.27 |
| 5,301,668 A | | 4/1994 | Hales | 128/205.23 |
| 5,420,828 A | * | 5/1995 | Geiger | 367/131 |
| 5,899,204 A | * | 5/1999 | Cochran | 128/205.23 |
| 6,008,780 A | * | 12/1999 | Clarke et al. | 345/8 |
| 6,028,625 A | * | 2/2000 | Cannon | 348/135 |
| 6,039,446 A | * | 3/2000 | Lahteenmaki | 351/43 |
| 6,525,762 B1 | * | 2/2003 | Mileski et al. | 348/81 |

* cited by examiner

Primary Examiner—Vu Le

(57) ABSTRACT

A method and system for an inexpensive wireless imaging are provided which allows a user to take hands-free video or still-picture images. An imaging system includes a mask adapted to be worn by a user having a viewing area covered by a faceplate, an imaging subsystem which is mounted on the mask and adjacent to the faceplate, and an image storage system which is positioned outside the mask in close proximity to the user. The imaging subsystem is adapted to capture images positioned in front of the faceplate. The image storage system is operatively connected to the imaging subsystem by wireless communication and is capable of storing the images and instantly replaying the images for viewing by the user.

23 Claims, 3 Drawing Sheets

UNDERWATER WIRELESS IMAGING METHOD AND SYSTEM

TECHNICAL FIELD

The present invention relates generally to methods and apparatus for used in connection with underwater diving equipment, and more particularly to a method and a system for underwater wireless imaging.

BACKGROUND ART

The introduction of underwater diving using Self-Contained Underwater Breathing Apparatus (SCUBA) opened up new possibilities in underwater exploration. Today, SCUBA diving is a very popular sport as well as an indispensable professional activity. Diving is expected to become more widespread both as a recreational activity and as a professional endeavor. Snorkeling is another popular aquatic sport for many people. Often, it is desirable to capture the beautiful scenery underwater, such as fish and coral, using either a video camera or a still-picture camera. However, most of the cameras for underwater use are expensive, heavy and bulky. In addition, their operation typically requires a user to hold a camera with one hand, leaving the user with only one other hand for swimming or performing tasks underwater.

Wireless video has been used where a diver carries a video camera with a wireless transmitter. The video signal is transmitted to a receiver located topside, such as on a boat. However, this type of wireless transmission suffers significant attenuation through water. A powerful, and therefore a bulky, heavy and expensive transmitter and receiver are usually required.

There is a need therefore, for in improved underwater camera which allows a user to take video or still-pictures underwater and is inexpensive, light weight, small, easy to carry, and adapted for hands-free operation.

DISCLOSURE OF THE INVENTION

The present invention provides a method and system for an improved imaging system which allows a user to take video or still-picture images and is inexpensive, light weight, small, easy to carry, and adapted for hands-free operation.

The present invention provides an imaging system having a mask with a viewing area covered by a faceplate, an imaging subsystem which is mounted in fixed relation to the mask adjacent to the faceplate, and an image storage system which is positioned outside the mask and is in close proximity to the user. The imaging subsystem is adapted to capture images positioned in front of the faceplate. The image storage system is operatively connected to the imaging subsystem by wireless communication and is capable of storing the images.

The present invention further provides a method for wireless imaging. The method includes (a) providing a mask adapted to be worn by a user which covers at least the eyes of the user and has a viewing area covered by a faceplate, (b) capturing images positioned in front of the faceplate using an imaging subsystem, and (c) transmitting by wireless communication the images to an image storage system capable of storing the images, where the image storage system is positioned outside the mask and in close proximity to the user.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
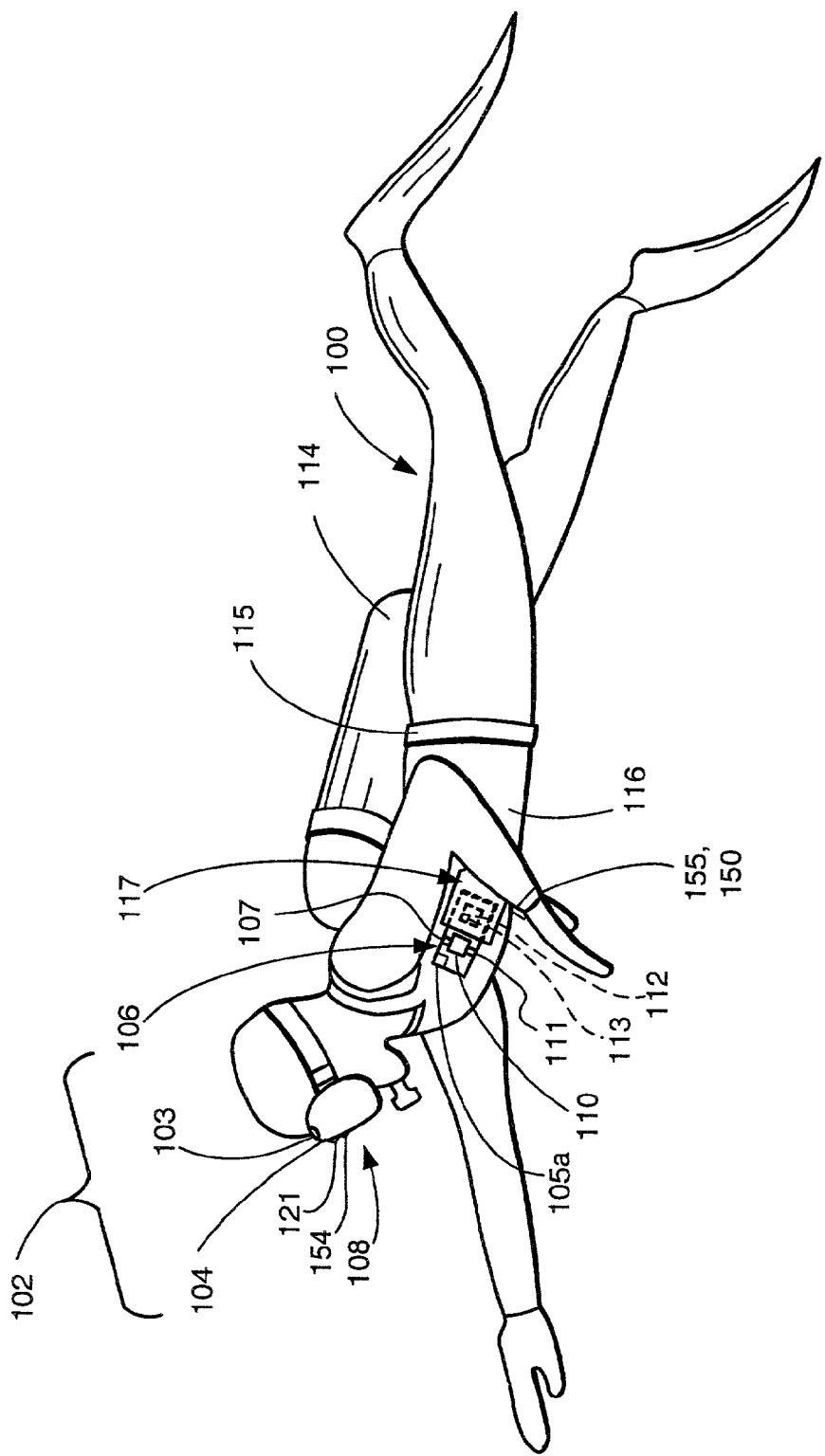
FIG. 1 is a side view of a diver using a diving mask and an image storage system in accordance with certain principles of the present invention.

Referring now to FIG. 1, therein is shown a side view of a diver 100 using an underwater wireless imaging system 102 constructed in accordance with the present invention. The wireless imaging system 102 includes a wireless imaging subsystem 104 and an image storage system 106. The wireless imaging subsystem 104 is integrated with a diving mask 108, which is worn by a diver 100.

The image storage system 106 is packaged in a waterproof housing (not shown) and 10: includes a first battery power supply 107 operatively connected to the image storage system 106 for providing the power needed to operate the image storage system 106, a wireless receiver 110, and an image storage subsystem 112. The wireless receiver 110 is configured to receive video or still images from the wireless imaging subsystem 104. The wireless receiver 110 may include an antenna (not shown). The image storage subsystem 112 is operatively connected to the wireless receiver 110 and is configured to store video or still images received by the wireless receiver 110. The image storage subsystem 112 includes a memory system 113, which may be a solid-state memory such as flash memories or flash cards. Solid-state memories are preferred because they are small and light in weight and do not require mechanical driving components. It will be appreciated that the memory system 113 may include other types of storage systems, such as optical disk storage, laser disk storage, computer disk storage, and mini-video tape storage. The first battery power supply 107 may be augmented by solar power supplied by a first solar device 105a mounted on the image storage system 106.

The diver 100 is equipped with conventional underwater diving equipment including a scuba air tank 114, a weight belt 115, and a buoyancy control device (BCD) vest 116 which is worn by the diver 100. The diver 100 carries the image storage system 106 in a pocket 117 formed in the BCD vest 116. Alternatively, the image storage system 106 may be conveniently carried by the diver 100 by mounting it on a body part of the diver 100, such as on the diver's wrists, arms, or legs; mounting it on other equipment carried by the diver 100, such as on the hoses from the scuba air tank 114 (to also allow simultaneous recording of dive data); or inserting it into a pocket of the BCD vest worn by the diver 100.

Figure 2B:
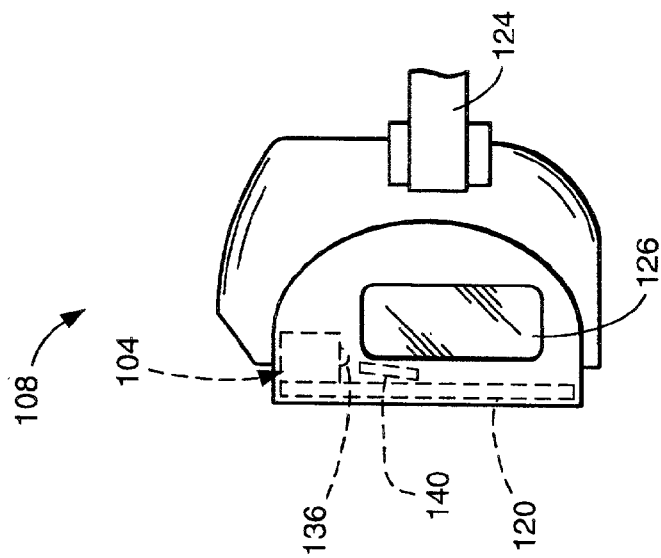
FIG. 2B is a side view of an embodiment of the present invention in which a camera and a wireless transmitter have been integrated into a diving mask.
Figure 2A:
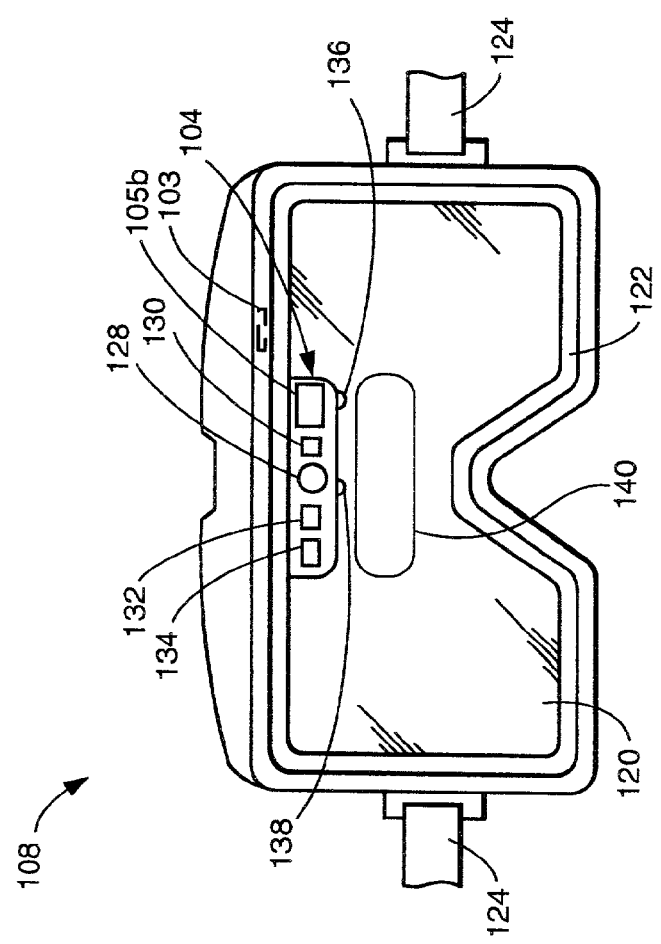
FIG. 2A is a front view of an embodiment of the present invention in which a camera and wireless transmitter have been integrated into a diving mask.

Referring now to FIGS. 2A and 2B, therein are shown front and side views, respectively, of the diving mask 108 constructed in accordance with the present invention. The diving mask 108 includes a faceplate 120, which provides a field of view to the diver. A diving mask bezel 122 holds the faceplate 120 in place. Also represented in FIGS. 2A and 2B is a strap 124 which functions to keep the diving mask 108 in place on the head of the diver 100. The diving mask 108 may also feature a side lens 126 as is represented in FIG. 2B.

The wireless imaging subsystem 104 may be mounted in a fixed relation to the diving mask so as to allow for unobstructed head movements of the diver 100. In this embodiment, the wireless imaging subsystem 104 is shown mounted to a top portion of the faceplate 120. The wireless imaging subsystem 104 may be mounted to the faceplate 120 by fasteners or by industrial strength adhesives, and it may also be formed integrally to the dive mask. It will be appreciated the wireless imaging subsystem 104 may be mounted to other locations of the diving mask 108 so long as it does not block the field of view of the diver 100.

In this embodiment, the wireless imaging subsystem 104 is packaged in a waterproof housing (not shown) within the diving mask 108. The wireless imaging subsystem 104 includes a miniature camera 128 configured to capture video or still images positioned in front of the wireless imaging subsystem 104, including images seen by the diver 100. When the diver 100 moves his or her head to look at an object, the camera 128 will follow this head movement and be able to capture an image of the object, as viewed by the diver 100. It will be appreciated that the wireless imaging subsystem 104 may be mounted on the outside of the diving mask 108.

The camera 128 preferably is an auto-focus camera. The camera 128 is also configured to capture images using imaging techniques such as analog, digital, infrared, laser, and a combination of such imaging techniques. The wireless imaging subsystem 104 further includes a first power on/off switch 130 for turning the camera 128 on and off (power up and down, respectively), and a second start/stop switch 132 for starting and ending a video imaging process or for taking a still-picture of an image. The wireless imaging subsystem 104 still further includes a wireless transmitter 134 which is operatively coupled to the camera 128 for transmitting video or still-picture images captured by the camera 128 to the image storage system 106 (not depicted in FIG. 2A or 2B) using wireless transmission underwater. The wireless imaging subsystem 104 also includes a first indicator device 136 for indicating whether the camera 128 is on (the "standby" mode) or off, and a second indicator device 138 to indicate whether the camera 128 is starting or ending a video imaging process, or taking a still-picture. The first and second indicator devices 136 and 138 may include light-emitting diodes (LEDs) of different colors for ease of identification by the diver. In one embodiment, the first indicator device 136 includes a green LED and the second indicator device 138 includes a red LED. In this embodiment, the first and second indicator devices 136 and 138 may be formed inside the diving mask 108, or in such a manner that they are visible to the diver. The first and second indicator devices 136 and 138 are visible outside the diving mask 108 so as to alert other divers, for example, that a video imaging is in progress or a still-picture is being taken. Alternatively, the first and second indicator devices 136 and 138 may include sound indicators that produce beeping sound using an audio device (not shown) in the diving mask 108.

The wireless imaging subsystem 104 also includes a second battery power supply 103 operatively connected to the wireless imaging subsystem for providing the power needed to operate the wireless imaging subsystem. Since the wireless imaging subsystem 104 is separated from the image storage system, it weighs less than a conventional camera. For the same reason, the power consumption for the wireless imaging subsystem 104 is also much lower than that of a conventional camera. Therefore, a small battery power supply would be adequate.

In addition, the second battery power supply 103 may be augmented by solar power supplied by a second solar device 105b mounted on the diving mask 108. This further helps to reduce the weight of the wireless imaging subsystem 104 so that the diving mask is light enough to be worn comfortably by the diver and not hinder the movement of the diver's head. It should be noted that the amount of sunlight reduces as the diver 100 goes deeper into the water since water attenuates light very quickly. Therefore, one principle use of solar devices would be to allow a user to recharge the first and second battery power supplies 107 and 103, respectively, when the wireless imaging system is out of the water. One solar device, 105a (seen in FIG. 1) may be used as a power supply for the image storage system, whereas a second device, 105b (seen in FIG. 2A) may be used as a power supply for the wireless imaging subsystem.

It will also be noted that switches 130 and 132 can be pressure-sensitive toggle switches; these switches are preferably of a size to ensure that they can be accurately operated with a gloved hand. It will be appreciated that the switches 130 and 132 can be located in other positions (beyond that indicated in FIG. 2A), such as at a corner of the faceplate 120, so long as the locations provide a convenient and easy-to-reach location for the diver 100. In an alternate embodiment (not shown), the switches 130 and 132 may positioned outside of the faceplate 120, for example, in a wireless control unit either integral with the image storage system 106 or as part of a dive computer. The switches 130 and 132 could also be configured as audio switches that are operable using audio command from the diver 100; such an embodiment could be used, for example, in non-SCUBA equipment such as may be used for salvage or repair diving, where dive mask configuration permits user speech.

The wireless imaging subsystem 104 also includes a wireless transmitter 134, which is mounted in close proximity to the camera. This transmitter is preferably mounted in the same watertight unit as the camera 128, so that there is no risk of leakage or short. The wireless transmitter 134 sends captured images to a wireless receiver that, as mentioned earlier, may be carried by the diver separately from the diving mask.

With reference to FIG. 1, images received by the wireless receiver 110 are stored in the image storage subsystem 112. Since the wireless receiver 110 is in relatively close proximity to the transmitter, the transmitter and receiver can both be made to be low power devices because attenuation through water is not a significant concern. Thus, both the wireless transmitter and the wireless receiver 110 can be small, light weight, inexpensive and low power. This further helps to reduce the size, weight and cost of the wireless imaging system 102, including the wireless imaging subsystem 104. In addition, since the wireless transmitter and the wireless receiver 110 are in close proximity to each other, any other devices capable of wireless information transfer may be used. For example, infrared devices, acoustic devices, laser light devices, visible light devices, or a combination thereof, may be used in accordance with the present invention.

Since storage of uncompressed video images requires a large amount of memory, video images are preferably compressed, for example into an MPEG-2 format video, before storage. The MPEG-2 format is the acronym for "Moving Pictures Experts Group 2," and defines is a set of standards for audio and video compression established by the Joint ISO/IEC Technical Committee on Information Technology. In one embodiment, the video images are captured and wirelessly transmitted to the wireless receiver 110 in an uncompressed video format. The video images are then compressed by a video compression unit 111 within the image storage system 106 to form compressed video images. The compressed video images are then stored in the image storage subsystem 112. It should be noted while video image compression is a power consuming process, it is not a problem with the present invention because the image storage system 106 has sufficient power to handle this process.

Another advantage of the wireless imaging system 102 is that there is no wire connecting the wireless imaging subsystem 104 and the image storage system 106. Thus the diver 100 does not have to worry about a safety risk posed by wires getting caught in underwater objects, such as underwater plants, coral, fishing net or line, or other obstructions.

Figure 3B:
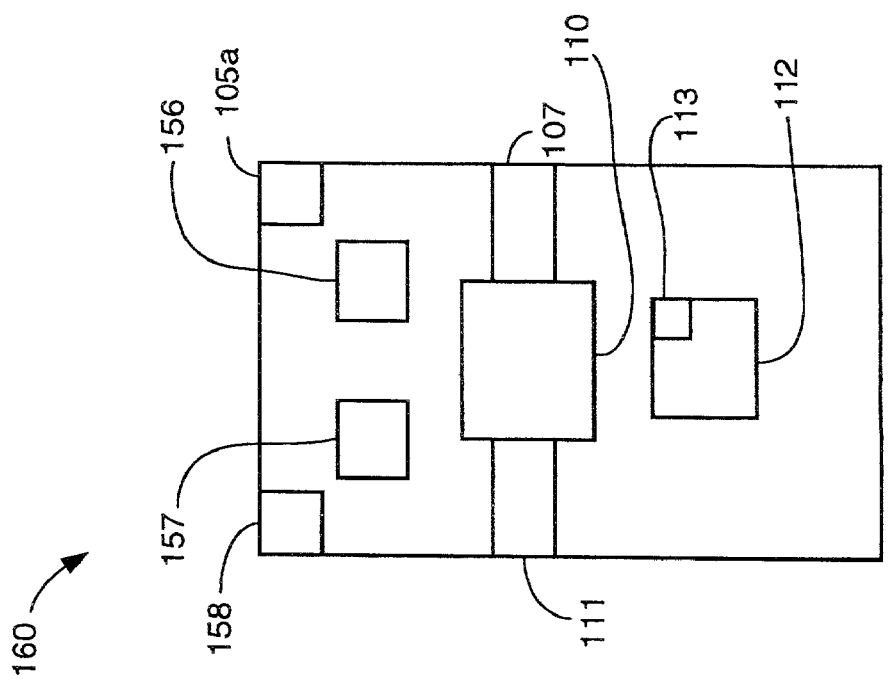
FIG. 3B is a front view of an image storage system constructed in accordance with the present invention.
Figure 3A:
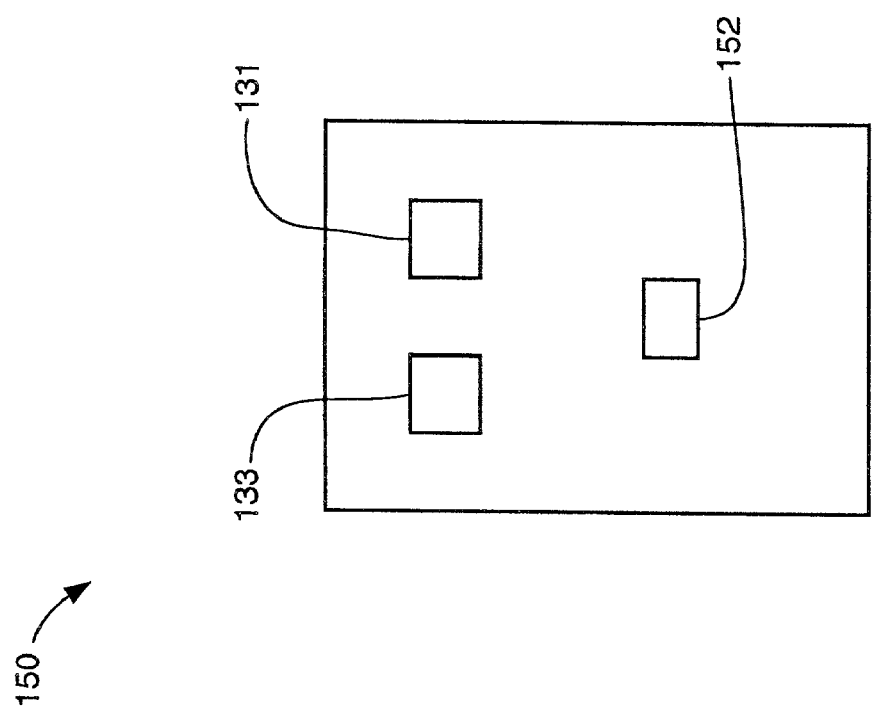
FIG. 3A is a front view of an imaging subsystem control unit constructed in accordance with the present invention.

Referring now to FIG. 3A, therein is shown an imaging subsystem control unit 150 that represents yet another embodiment of the present invention. The imaging subsystem control unit 150 is physically separated from the wireless imaging subsystem 104 and adapted to control the wireless imaging subsystem 104 using wireless communication. The imaging subsystem control unit 150 includes switches 131 and 133, and also a second wireless transmitter 152. The imaging subsystem 104 may in this embodiment include a second wireless receiver 154 (seen in FIG. 1). The imaging subsystem control unit 150 can be mounted on a body part of the diver 100 (e.g., strapped to the wrist of the diver), mounted on or adjacent to equipment carried by the diver 100 (e.g., mounted adjacent to or integrated with equipment such as a dive computer 155 carried by the diver). In this embodiment, the switches 131 and 133 are operatively connected to the camera 128 using wireless communication and serve the same functions as the toggle switches mentioned previously, except that they are remotely mounted from the diving mask. When either the switch 131 or 133 is pressed, a control signal is transmitted by the second wireless transmitter 150 via underwater wireless transmission to the second wireless receiver 154. The second wireless receiver 154 then transmits the control signal to the camera 128 to control its functions, i.e., on/off, starting/ending a video image processing, or taking a still-picture.

Referring now to FIG. 3B, therein is shown an image storage system 160 that represents still another embodiment of the present invention, as this image storage system may be used by the diver to remotely control operation of the camera. All the parts that are the same as shown in FIG. 1 have the same nomenclature and numbers in FIG. 3B. The image storage system 160 includes two toggle switches 156 and 157. The image storage system 160 also includes a second wireless transmitter 158. In this embodiment, the imaging subsystem 104 also includes the aforementioned second wireless receiver 154. When either the switch 156 or 157 is pressed, a control signal is transmitted by the second wireless transmitter 158 via underwater wireless transmission to the second wireless receiver 154. The second wireless receiver 154 then transmits the control signal to the camera 128 to control its functions, i.e., on/off, starting/ending a video image processing, or taking a still-picture.

In one embodiment, the diving mask 108 includes a fisheye lens 121 formed on the faceplate 120 or mounted in front of the camera 128 (FIG. 1). Fisheye images are captured by the camera 128 and are stored in compressed format by the image storage subsystem. Prior to processing, fisheye images are not very useful because they are typically distorted. However, fisheye images may be processed by optically and other means to provide processed fisheye images. Processed fisheye images provide different scenes that were captured in front of the diver 100 and the camera 128, including those that are at an angle to the diver 100. For example, during a dive, the camera 128 captures fisheye images in the form of a hemisphere of distorted visual data centered about the direction of the faceplate 120. The fisheye images are then processed to form processed fisheye images. The processed fisheye images provide undistorted images within the hemisphere but at an angle to the diver 100 and the camera 128. Fisheye images and processed fisheye images are useful in certain applications when wide-angled views of a scene are required. It has been reported that very small image sensors (e.g., with sizes slightly larger than a pencil eraser) have been developed that can capture fisheye images.

In another embodiment, the diving mask 108 includes a liquid crystal display (LCD) 140 mounted inside and on the top of the diving mask 108, and adjacent the wireless imaging subsystem (FIG. 2A). The LCD 140 may be mounted at an angle to the faceplate 120 so as to allow the diver 100 to view the content displayed on the LCD 140. One of the functions of the LCD 140 is to perform instant replay by displaying images captured by the wireless imaging subsystem 104. Other functions of the LCD 140 may include displaying information provided by the dive computer (not shown in FIG. 2), such as depth data, dive time and remaining air data. In this embodiment, the image storage subsystem 112 includes a second wireless transmitter (not shown) that is connected to the image storage subsystem 112. The wireless imaging system 102 includes a second wireless receiver (not shown) that is used to provide data to the LCD 140. To perform an instant replay, the second wireless transmitter retrieves video or still-picture images from the image storage subsystem 112 (and decompresses that data if appropriate) and transmits the images to the second wireless receiver using wireless communication. The LCD 140 receives the images from the second wireless receiver and displays the images on the LCD 140. Similarly, the second transmitter and receiver may be any devices that are capable of wireless information transfer, such as radio-frequency wireless devices, infrared devices, acoustic devices, laser light devices, or visible light devices. In an alternative embodiment, the LCD 140 may be an eyeglass display built directly into the faceplate 120. In this case, the surface of the LCD 140 is parallel to the surface of the faceplate 120, and as should be apparent, is therefore mounted in fixed relation to the faceplate 120. In yet another embodiment, the LCD may actually be integrated with a dive computer (depicted by numeral 155 in FIG. 1), which may feature a video or image playback mode.

In operation, during a dive, the diver 100 presses a power on switch 130 (or in alternative embodiments, switch 131 or 156) to turn "on" the wireless imaging subsystem 104. In response, the first indicator device 136 lights up. [The diver 100 might also depending upon implementation also be required to separately turn on the image storage system 106; alternately, the image storage system may also be made to "wake up" from a sleep mode via wireless communication as the diver turns on the wireless imaging system.]

Next, when the diver 100 wishes to take a video picture of a scene he/she sees through the diving mask 108, the diver 100 presses a start/stop switch 132 (or switch 133 or 157 in alternative embodiments) to start capturing the video picture using the camera 128. In response, the second indicator device 138 lights up. Further, the video images that are captured by the camera 128 are transmitted by the wireless transmitter 134 via wireless transmission underwater to the wireless receiver 110 in the image storage system 106. The image storage subsystem 112 stores the video images. Alternatively, the video images may first be compressed by the video compression unit of the image storage system 106 before storing by the image storage subsystem 112.

When the diver 100 is done with taking the video picture, the diver 100 again presses the start/stop switch to stop the video imaging process. The second indicator device 138 then turns off.

If the camera 128 is a still-picture camera, then the second indicator device 138 turns on when the diver 100 presses the start/stop switch, which indicates that a still-picture is being taken. The second indicator device 138 will automatically turn off after the picture is taken. Similarly, the still-picture images that are captured by the camera 128 are transmitted by the wireless transmitter 134 via wireless transmission underwater to the wireless receiver 110 in the image storage system 106. The image storage subsystem 112 stores the still-picture images.

If the power on/off switch and start/stop switch are designed to be triggered by audio commands from the diver 100, the diver 100 will give the appropriate audio (or verbal) command to operate the camera 128. In this case, the diver 100 will have his hands free to perform other tasks while operating the camera 128.

The process is then repeated when the diver wishes to take another video picture or still-picture.

After the dive is completed, the image information stored in the image storage subsystem 112 may be retrieved or downloaded to a computer system for viewing or processing. The image information may include video images, still-picture images and fisheye images. Other pertinent information about the images, such as date and time when the images were captured, location of the where the images were captured, water temperature, dive duration, dive depth, etc., could additionally be stored with the images for later viewing. This pertinent information may be stored in the memory of the computer system or in the image storage subsystem 112.

Accordingly, the present invention provides an improved underwater camera which allows a user to take video or still-pictures underwater and is inexpensive, light weight, small, easy to carry, and adapted for hands-free operation.

While the best mode involves performing wireless imaging underwater, it should be understood that the present invention is equally applicable to other adverse environment where a small and lightweight imaging system and hands-free operation is desirable. This would include operations in other adverse environments, such as firefighters in a burning building, policeman in a law enforcement operation such as rescuing hostages, etc.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit of the included claims. All matters hither-to-fore set forth herein or shown in the accompanying drawings are to be interpreted in an illustrative and non-limiting sense.

What is claimed is:

1. An imaging system for a user, comprising:
    a mask adapted to be worn by a user which covers at least the eyes of said user and has a viewing area covered by a faceplate;
    an imaging subsystem mounted in fixed relation to said mask adjacent said faceplate, said imaging subsystem adapted to capture images positioned in the viewing area covered by said faceplate; and
    an image storage system positioned outside said mask and capable of storing said images, said image storage system carried on a body part of said user and operatively connected to said imaging subsystem by wireless communication.

2. The imaging system as claimed in claim 1 wherein said mask is a diving mask.

3. The imaging system as claimed in claim 1 wherein said image subsystem is adapted to follow head movements of said user.

4. The imaging system as claimed in claim 1 wherein said imaging subsystem includes a camera capable of capturing images using imaging techniques selecting from the group consisting of analog, digital, infrared, laser, and a combination of said imaging techniques.

5. The imaging system as claimed in claim 4 wherein said imaging subsystem includes a camera selected from the group consisting of video camera and still-picture camera.

6. The imaging system as claimed in claim 1 wherein:
    said imaging subsystem includes a camera;
    said imaging system further comprises an imaging subsystem control unit adapted to control said imaging subsystem using wireless communication, said imaging subsystem control unit adapted to be mounted on a body part of said user, mounted on equipment carried by said user, or integrated with equipment carried by said user; and
    said imaging subsystem control unit includes a control switch adapted to perform one of starting video image capture and taking a still-picture.

7. The imaging system as claimed in claim 6 wherein said imaging subsystem control unit is integral with a wrist-mounted dive computer and further includes a control switch adapted to end a video capture which is in progress.

8. The imaging system as claimed in claim 6 wherein said imaging subsystem control unit further includes at least one control switch adapted to turn at least part of said imaging system on and off by wireless command.

9. The imaging system as claimed in claim 1 wherein:
    said imaging subsystem includes a wireless transmitter for transmitting said images to said image storage system by wireless communication; and
    said image storage system includes a wireless receiver capable of receiving said images from said imaging subsystem by wireless communication.

10. The imaging system as claimed in claim 9 wherein said image storage system includes:
    a video compression unit operatively connected to said wireless receiver and capable of compressing said images into compressed images; and
    an image storage subsystem operatively connected to said video compression unit and capable of storing said compressed images.

11. The imaging system as claimed in claim 1 wherein:
said imaging subsystem includes a second wireless receiver; and
said imaging storage system includes a second wireless transmitter capable of transmitting control signals to said second wireless receiver by wireless communication, said control signals including a first signal to turn said imaging subsystem on and off and a second signal to start and end video image processing or taking a still-picture.

12. The imaging system as claimed in claim 1 wherein said image storage system carried on said body part of said user includes mounting said image storage system on equipment carried by said user or insertion of said image storage system into a pocket of a buoyancy control device vest worn by said user.

13. The imaging system as claimed in claim 1 wherein said imaging system further comprises:
a first power supply that provides power to said image storage system; and
a second power supply distinct from said first power supply, that provides power to said imaging subsystem.

14. The imaging system as claimed in claim 13 wherein:
said first power supply includes a first solar device for generating solar power.

15. The imaging system as claimed in claim 1 further including:
a liquid crystal display (LCD) mounted inside said mask and in fixed relation to said faceplate, said LCD capable of displaying said images for viewing by said user.

16. The imaging system as claimed in claim 1 further including a fisheye lens mounted in front of said imaging subsystem, wherein said imaging subsystem is adapted to capture fisheye images using said fisheye lens.

17. An imaging system, comprising:
a diving mask adapted to be worn by a user which covers at least the eyes of sad user and has a viewing area covered by a faceplate;
an imaging subsystem mounted in fixed relation to said diving mask adjacent said faceplate, said imaging subsystem adapted to capture images positioned in front of said faceplate and to follow head movements of said user, said imaging subsystem including:
a camera capable of capturing images using imaging techniques selected from the group consisting of analog, digital, infrared, laser, and a combination of said imaging techniques, said camera selected from the group consisting of video camera and still-picture camera, and
a wireless transmitter for transmitting said images by wireless communication; and
an image storage system positioned outside said diving mask capable of storing said images, said image storage system being carried by said user and operatively connected to said imaging subsystem by wireless communication, said wireless communication including at least one of radio frequency communication, infrared communication, acoustic communication, laser light communication, and visible light communication, said image storage system including:
a wireless receiver capable of receiving said images from said wireless transmitter by wireless communication, and
an image storage subsystem operatively connected to said wireless receiver and capable of storing said images, said image storage subsystem including a memory system selected from the group consisting of solid state memories, optical disk storage, laser disk storage, computer disk storage, and mini-video tape storage.

18. A method for wireless imaging, comprising:
using an imaging subsystem to capture images positioned in front of a faceplate of a mask adapted to be worn by a user, said mask covering at least the eyes of said user and having a viewing area covered by said faceplate; and
transmitting by wireless communication said images to an image storage system capable of storing said images, said image storage system being positioned outside said mask and carried on a body part of said user.

19. The method as claimed in claim 18 wherein transmitting by wireless communication said images to an image storage system includes:
transmitting said images to a wireless receiver associated with the image storage system;
compressing said images into compressed images using a video compression unit operatively connected to said wireless receiver; and
storing said compressed images using said image storage subsystem.

20. The method as claimed in claim 19 wherein storing said images using an image storage subsystem includes storing images using a solid state memory system.

21. The method as claimed in claim 18 further comprising storing images in a storage device adapted for location within a pocket of a buoyancy control device worn by said the user.

22. The method as claimed in claim 18 further including displaying said images on a liquid crystal display (LCD) for viewing by said user, wherein said LCD is mounted inside said mask and in fixed relation to said faceplate.

23. A method for wireless imaging, comprising:
using an imaging subsystem to capture images positioned in front of a faceplate of a diving mask adapted to be worn by a user, said diving mask covering at least the eyes of said user and having a viewing area covered by said faceplate, said imaging subsystem adapted to follow head movements of said user, said imaging subsystem using a camera capable of capturing images using imaging techniques selected from the group consisting of analog, digital, infrared, laser, and a combination of said imaging techniques, said camera selected from the group consisting of video camera and still-picture camera;
transmitting said images to an image storage system positioned outside said mask and in proximity to said user by wireless communication using a wireless transmitter and a wireless receiver, said wireless receiver capable of receiving said images from said imaging subsystem, said image storage system carried by said user and including an image storage subsystem operatively connected to said wireless receiver, and said wireless communication using communication techniques selected from the group consisting of radio frequency communication, infrared communication, acoustic communication, laser light communication, visible light communication, and a combination of said communication techniques; and
storing said images in memory of said image storage subsystem where said memory includes at least one memory device selected from the group of solid state memories, optical disk storage, laser disk storage, computer disk storage, and mini-video tape storage.

* * * * *